| | | |
|---|---|---|
| United States Patent [19] | [11] | 4,339,542 |
| Reven | [45] | Jul. 13, 1982 |

[54] PLASTIC RAMMING MIX BASED ON MGO

[75] Inventor: Frederick V. Reven, Homewood, Ill.

[73] Assignee: Nalco Chemical Company, Oak Brook, Ill.

[21] Appl. No.: 295,424

[22] Filed: Aug. 24, 1981

[51] Int. Cl.³ .............................................. C04B 35/04
[52] U.S. Cl. .................................. 501/109; 501/118; 501/121
[58] Field of Search ....................... 501/109, 118, 121

[56] References Cited

U.S. PATENT DOCUMENTS

| | | | |
|---|---|---|---|
| 3,241,987 | 3/1966 | Dreyling et al. | 501/111 |
| 3,652,305 | 3/1972 | Cook | 501/109 |
| 4,048,134 | 9/1977 | Courtenay et al. | 501/118 |

*Primary Examiner*—James Poer
*Attorney, Agent, or Firm*—John G. Premo; Robert A. Miller

[57] ABSTRACT

A stable aqueous magnesium oxide refractory ramming mix using an alkali metal aluminate as a binder component is disclosed.

4 Claims, No Drawings

PLASTIC RAMMING MIX BASED ON MGO

There has been a long felt need for a refractory composition consisting primarily of magnesium oxide that could be prepared in fluid form, and remain stable over a period of time for application at a job site. Unfortunately, one of the characteristics of magnesium oxide is that it hydrates rapidly in the presence of water and solidifies, generally ruling out the possibility of using water-based compositions of this type.

While the prior art has taught the use of magnesium oxide materials which satisfy the above requirement, they generally employ organic solvents such as ethylene glycol which while being water-miscible, flashes off at the drying and use temperatures of the refractory in the foundry, steel and aluminum industries. The presence of organic solvent is unsatisfactory from both fire and environmental standpoints.

Examples of compositions of this type are found in U.S. Pat. Nos. 3,652,305 and 3,241,987.

Thus, an aqueous based magnesium oxide ramming material which is fluid enough to be applied to repair furnaces, ladles, troughs, etc. used in the metal production industries has been a goal of the refractory industry.

I have discovered a magnesium oxide composition which is aqueous in nature, fluid, storable over long periods of time and which does not employ an organic solvent. The material of this invention is superior to alumina-based materials in basic slag resistance and provides a highly refractory magnesium containing ramming repair material. A further advantage of this material is the fact that the mixture is storable over long periods of time, remains fluid, and can be applied as is when necessary.

It is therefore an object of this invention to provide to the art a fluid, aqueous, magnesium oxide refractory ramming mix. A further object of this invention is to provide to the art a fluid magnesium oxide ramming mix having an alkali metal aluminate binder system.

Further objects will appear hereinafter.

THE INVENTION

The aqueous magnesium oxide ramming mix of this invention is composed of the following five ingredients: particulate magnesium oxide, alumino-silicate clay, molasses, alkali metal aluminate, and water.

The magnesium oxide utilized in this invention is commonly referred to as a dead burned material and typically has the following composition:

$SiO_2$ 4.6% by weight
$Fe_2O_3$ 2.7
$Al_2O_3$ 1.2
$CaO$ 4.2
$MgO$ 87.3

Generally material useful in my invention will have a particle size of less than −10 mesh, although other particulate magnesium oxide materials can be employed. Other sizes of particulate magnesium oxide may also be employed in this invention.

The alumino-silicate clays useful in this invention are typically kaolinites, but other alumino-silicate clays familiar to the artisans in the refractory industry may be used.

A certain amount of clay is essential to the refractory ramming mix composition of the subject invention to provide the plasticity and workability which is needed for ramming. The clay which is referred to as being useful in the composition can be any of a number of plastic clays which are available commercially. A Georgia kaolin clay has been used as a preferred material; however, it is not intended to limit the scope of the subject invention to any particular clay, as any of a wide range of plastic clays can be utilized. It has been found that at least 2% of clay must be present in the mix to give it the necessary plasticity and workability for ramming.

The binder used in this invention and which is believed to provide the refractory composition of this invention with its unique properties includes a blend of alkali metal aluminate, preferably sodium aluminate, in combination with molasses and water. It is not known how the alkali metal aluminate functions in this invention, but it is believed that the aluminate material prevents the magnesium oxide from hydrating and thus solidifying during storage.

The preferred alkali metal aluminates which are employed in this invention have a minimum amount of excess sodium ion. Thus, ratios of $Na_2O/Al_2O_3$ should range from 1.0 to about 1.25 with a preferred ratio being from 1 to 1.20. It should be pointed out that some excess $Na_2O$ will be present in most commercially available aluminates for stability purposes.

The additional ingredient used in this invention is water. Water may be present in both the binder when it is added to the magnesium oxide and clay, and additional water may be added, but is not necessary, to dilute the finished product to a proper working consistency.

Generally the composition of this invention will have the ingredients below in their weight percentages:
40–98% particulate magnesium oxide
1–20% alumino-silicate clay
0.3–4% molasses
0.5–7.5% alkali metal aluminate
0.8–27% water Preferably the refractory compositions of this invention will contain:
40–90% particulate magnesium oxide
4–10% alumino-silicate clay
0.6–2.0% molasses
0.75–5% alkali metal aluminate
0.5–10% water Most preferably the following ingredients will be present:
60–85% particulate magnesium oxide
2–15% alumino-silicate clay
0.4–3% molasses
0.6–7% alkali metal aluminate
1–20% water

EXAMPLE

A plastic refractory ramming mix was prepared having the following ingredients in the following percentages by weight:
80.0% −10 mesh
87% dead burned magnesium oxide
8.0% kalonite clay
10.0% by weight of a binder preparation consisting of:
45.4% water
18.2% molasses
36.4% of sodium aluminate (dry) having a $Na_2O\ Al_2O_3$ ratio of 1.14 designated as NALCO ® 680, available from the Nalco Chemical Company 1.9% water 0.1% of an industrial biocide was also added to prevent bacterial degradation of the molasses during storage.

This material was rammed into a damaged spout of an electric furnace used in the manufacture of steel and dried. Performance of the resultant magnesium patch was satisfactory. The material was also employed as a ramming mix to repair an electric furnace runner. After drying, the material provided a satisfactory patch and adequately withstood molten steel. In both cases the subject material was superior to a high alumina ramming mix that had previously been added as far as longevity of the lining. In addition, the material remained fluid and could be applied several months after manufacture with no evidence of the magnesium oxide refractory mix hardening before use.

In contrast, it would be expected that a similar composition containing no aluminate and similar quantity of water would harden and start to set after only several weeks of storage.

Having thus described my invention, I claim:

1. A stable storable refractory ramming mix composition comprising in percentages by weight:
   (a) 40–98% particulate magnesium oxide
   (b) 1–20% alumino-silicate clay
   (c) 0.3–4% molasses
   (d) 0.5–7.5% alkali metal aluminate
   (e) 0.8–27% water 2. The composition of claim 1 comprising in percentages by weight:
   (a) 40–90% particulate magnesium oxide
   (b) 4–10% alumino-silicate clay
   (c) 0.6–2.0% molasses
   (d) 0.75–5% alkali metal aluminate
   (e) 0.5–10% water 3. The composition of claim 1 comprising in percentages by weight:
   (a) 60–85% particulate magnesium oxide
   (b) 2–15% alumino-silicate clay
   (c) 0.4–3% molasses
   (d) 0.6–7% alkali metal aluminate
   (e) 1–20% water 4. The composition of claim 1 wherein the alkali metal aluminate is sodium aluminate.

* * * * *